United States Patent
Sannomiya

(10) Patent No.: US 12,541,744 B2
(45) Date of Patent: Feb. 3, 2026

(54) RISK CALCULATING DEVICE, METHOD, AND PROGRAM

(71) Applicant: BRIDGESTONE CORPORATION, Tokyo (JP)

(72) Inventor: Takenori Sannomiya, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 14 days.

(21) Appl. No.: 18/709,813

(22) PCT Filed: Oct. 14, 2022

(86) PCT No.: PCT/JP2022/038474
§ 371 (c)(1),
(2) Date: May 14, 2024

(87) PCT Pub. No.: WO2023/112462
PCT Pub. Date: Jun. 22, 2023

(65) Prior Publication Data
US 2025/0005537 A1  Jan. 2, 2025

(30) Foreign Application Priority Data
Dec. 15, 2021  (JP) ................. 2021-203608

(51) Int. Cl.
*G06Q 30/00*  (2023.01)
*G06Q 10/20*  (2023.01)
*G06Q 50/40*  (2024.01)
(52) U.S. Cl.
CPC ............ *G06Q 10/20* (2013.01); *G06Q 50/40* (2024.01)

(58) Field of Classification Search
None
See application file for complete search history.

(56) References Cited

U.S. PATENT DOCUMENTS

2006/0036378 A1* 2/2006 Smith ............... E01C 23/00
702/57
2016/0047666 A1* 2/2016 Fuchs ............... G06Q 40/08
701/423

(Continued)

FOREIGN PATENT DOCUMENTS

CN  111598327 A    8/2020
CN  112907031 A *  6/2021 ....... G06Q 10/06393

(Continued)

OTHER PUBLICATIONS

Diagnostics of Aircraft Aerodynamics Changes in Emergency Situation in Flight, D.O. Shevchuk, 2013. (Year: 2013).*

(Continued)

*Primary Examiner* — Matthew T Sittner
(74) *Attorney, Agent, or Firm* — SOLARIS Intellectual Property Group, PLLC

(57) ABSTRACT

A data acquiring section acquires external damage information per tire mounted to airplanes, and site information relating to sites at which there is possibility that the tires incurred external damage. A processing section calculates risk, per site, of tires incurring external damage based on the external damage information per tire and the site information, An outputting section outputs the risk that has been calculated per site.

12 Claims, 8 Drawing Sheets

(56) References Cited

U.S. PATENT DOCUMENTS

| | | | |
|---|---|---|---|
| 2016/0171521 A1* | 6/2016 | Ramirez | G06Q 10/04 |
| | | | 701/409 |
| 2016/0303927 A1* | 10/2016 | Keller | B60C 23/0479 |
| 2018/0165890 A1* | 6/2018 | Buchholz | G08G 1/096716 |
| 2020/0110005 A1 | 4/2020 | Williams et al. | |
| 2022/0001879 A1* | 1/2022 | Verheijen | B60W 40/09 |
| 2023/0141375 A1* | 5/2023 | Crafton | B60C 19/00 |
| | | | 73/862.381 |

FOREIGN PATENT DOCUMENTS

| | | |
|---|---|---|
| JP | 6684409 B1 | 4/2020 |
| JP | 2021-14742 A | 2/2021 |

OTHER PUBLICATIONS

Marasova, Daniela et al: "Digitization of air transport using smart tires", 2020 New Trends in Aviation Development(NTAD), IEEE, Sep. 17, 2020 (Sep. 17, 2020), pp. 164-167, retrieved on Mar. 15, 2021.

International Search Report issued in International Application No. PCT/JP2022/038474 on Jan. 10, 2023.

\* cited by examiner

FIG.3

| TIRE IDENTIFICATION INFORMATION | COMPANY | AIRPORT WHERE EXTERNAL DAMAGE WAS INCURRED | | INFORMATION RELATING TO EXTERNAL DAMAGE TIME PERIOD | | RESULTS OF INSPECTION | | | |
|---|---|---|---|---|---|---|---|---|---|
| | | BASE AIRPORTS OF COMPANY | OPERATION HISTORY OF TIRE (DEPARTURE /ARRIVAL AIRPORTS) | OPERATION TIME PERIOD | INSPECTION DATE | | PLACE OF EXTERNAL DAMAGE | TYPE OF EXTERNAL DAMAGE | NUMBER OF PLACES OF EXTERNAL DAMAGE (EXTENT) |
| A0123 | JJ | HHH,NNN,III,KKK | HHH●%、KKK◆% | '20/5/1~10/3 | 2021/3/4 | OK | - | - | - |
| B0987 | JJ | HHH,NNN,III,KKK | NNN▲%、III■%... | '20/6/9~12/6 | 2021/5/20 | NG | TREAD | PUNCTURE | 3 |
| C5678 | NN | HHH,NNN,III,KKK | HHH★%、KKK▼%... | '20/4/6~11/4 | 2021/4/13 | NG | SIDEWALL | CUT | 1 |
| ... | ... | ... | ... | ... | ... | ... | ... | ... | ... |

RISK CALCULATING DEVICE, METHOD, AND PROGRAM

TECHNICAL FIELD

The present disclosure relates to a risk calculating device, method and program.

BACKGROUND ART

The need for technologies that collect and analyze inspection data as big data has increased in recent years. For example, a method has been conceived of in which inspection data of tires is collected, and events relating to the tires are analyzed.

In recent years, techniques of measuring the road noise of tires and evaluating road surfaces have been proposed (Japanese Patent Application Laid-Open (JP-A) No. 2021-14742). In the technique of JP-A No. 2021-14742, information of the current position of a vehicle is acquired from a GPS receiver, the road noise of the tires of the vehicle is measured by using a microphone, image data that enables evaluation of the road surface is generated, and road surface evaluation is carried out.

SUMMARY OF INVENTION

Technical Problem

In JP-A No. 2021-14742, devices for acquiring information of the current position of the vehicle and road noise of the tires in real time must be installed in the vehicle.

When using inspection data of tires, because the inspection data is not data that is acquired in real time, position information cannot be acquired in real time.

Further, if the inspection data of tires that are mounted to an airplane is used as a subject, because position information that is acquired in real time cannot be acquired, the position information must be acquired offline.

The technique of the disclosure was made in consideration of the above-described points, and an object thereof is to provide a risk calculating device, method and program that can calculate risks of respective sites at which there is the possibility that tires may be externally damaged, from information obtained by inspecting tires that are mounted to airplanes.

Solution to Problem

A first aspect is a risk calculating device comprising:
a data acquiring section acquiring external damage information per tire mounted to airplanes, and site information relating to sites at which there is possibility that the tires incurred external damage;
a processing section that, on the basis of the external damage information per tire and the site information, calculates risk, per site, of tires incurring external damage; and
an outputting section outputting the risk that has been calculated per site.

A second aspect is a risk calculating method in which a computer:
acquires external damage information per tire mounted to airplanes, and site information relating to sites at which there is possibility that the tires incurred external damage;
on the basis of the external damage information per tire and the site information, calculates risk, per site, of tires incurring external damage; and
outputs the risk that has been calculated per site.

A third aspect is a risk calculating program for causing a computer to execute processings of:
acquiring external damage information per tire mounted to airplanes, and site information relating to sites at which there is possibility that the tires incurred external damage;
on the basis of the external damage information per tire and the site information, calculating risk, per site, of tires incurring external damage; and
outputting the risk that has been calculated per site.

Advantageous Effects of Invention

In accordance with the technique of the disclosure, risks at respective sites at which there is the possibility that tires may be externally damaged can be calculated from information obtained by inspecting tires that are mounted to airplanes.

BRIEF DESCRIPTION OF DRAWINGS

FIG. 3 is a drawing illustrating the structure of a database.

DESCRIPTION OF EMBODIMENTS

Figure 1:
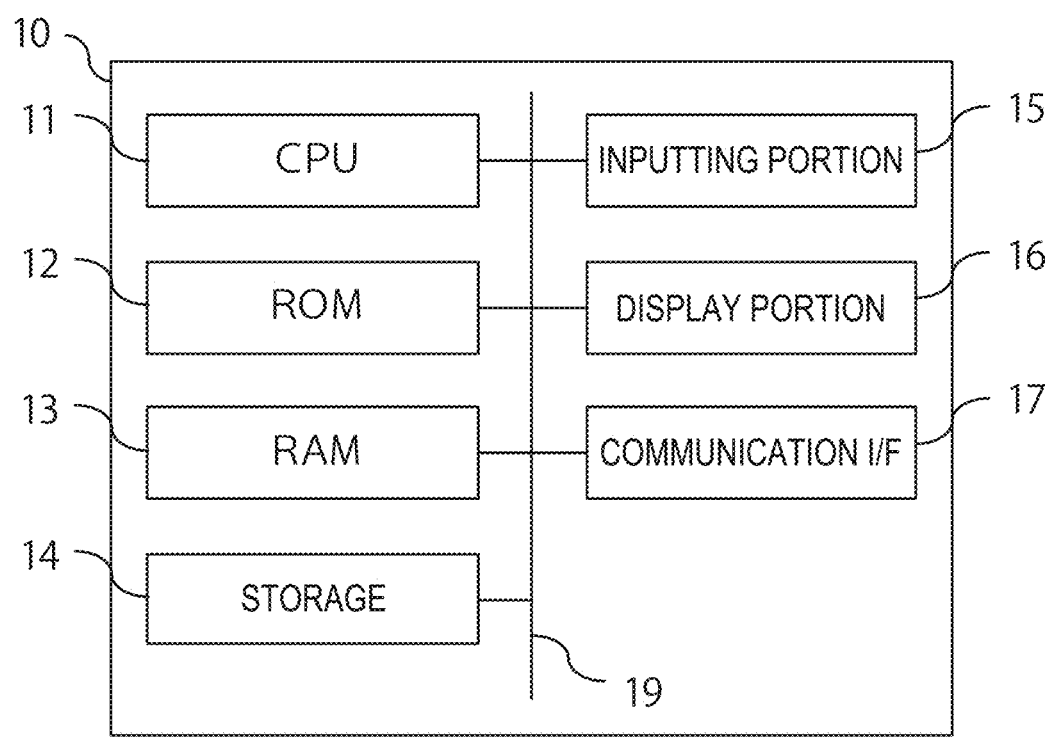
FIG. 1 is a schematic block drawing of an example of a computer that functions as a risk calculating device of a present embodiment.

Examples of embodiments of the technique of the disclosure are described hereinafter with reference to the drawings. Note that structural elements and portions that are the same or equivalent in the respective drawings are denoted by the same reference numerals. Further, the dimensional proportions in the drawings are exaggerated for convenience of explanation, and there are cases in which they differ from actual proportions.

Overview of Present Embodiment

In the present embodiment, the risk of external damage per airport is calculated from external damage information of tires that is acquired by tire inspections at times of retread inspections, and the operation histories of the tires (the histories of the departure/arrival airports). Due thereto, risk information of the risk of a tire being externally damaged due to fallen objects, fixed objects (e.g., lighting equipment), ruts and the like that exist on runways of airports, can be provided.

Structure of Risk Calculating Device Relating to Present Embodiment

FIG. 1 is a block drawing illustrating hardware structures of a risk calculating device 10 of the present embodiment.

As illustrated in FIG. 1, the risk calculating device 10 has a CPU (Central Processing Unit) 11, a ROM (Read Only Memory) 12, a RAM (Random Access Memory) 13, a storage 14, an inputting portion 15, a display portion 16 and a communication interface (I/F) 17. The respective structures are connected via bus 19 so as to be able to communicate with one another.

The CPU 11 is a central computing processing unit, and executes various programs, and controls the respective sections. Namely, the CPU 11 reads-out a program from the ROM 12 or the storage 14, and executes the program by using the RAM 13 as a workspace. In accordance with programs stored in the ROM 12 or the storage 14, the CPU 11 carries out control of the above-described various structures, and various types of computing processings. In the present embodiment, a risk calculating program for calculating external damage risk per site where airplanes depart/arrive is stored in the ROM 12 or the storage 14. The risk calculating program may be one program, or may be a program group structured by plural programs or modules.

The ROM 12 stores various programs and various data. The RAM 13 temporarily stores programs or data as a workspace. The storage 14 is structured by an HDD (Hard Disk Drive) or an SSD (Solid State Drive), and stores various programs, including the operating system, and various data.

The inputting portion 15 includes a pointing device such as a mouse or the like, and a keyboard, and is used in order to carry out various types of input.

The inputting portion 15 receives, as input, external damage information per tire mounted to an airplane, and site information relating to sites at which there is the possibility that the tire may have been externally damaged. Specifically, the inputting portion 15 receives, as input, external damage information that includes results of inspection, tire identification information, the places of the external damage, the type of the external damage, and the number of places of the external damage, which are external damage information that are obtained in the tire inspection at the time of a retread inspection. Further, the inputting portion 15 receives, as input, external damage information including airframe information, in which the tire identification information and identification information of the airplane to which the tire was mounted are associated with one another, and, per airplane identification information, history information of sites that are the airports where the airplane departed/arrived.

The display portion 16 is a liquid crystal display for example, and displays various types of information. A touch panel type display may be employed as the display portion 16 such that the display portion 16 functions as the inputting portion 15.

The communication interface 17 is an interface for communicating with other devices. For example, standards such as Ethernet®, FDDI, Wi-Fi® or the like are used thereat.

Figure 2:
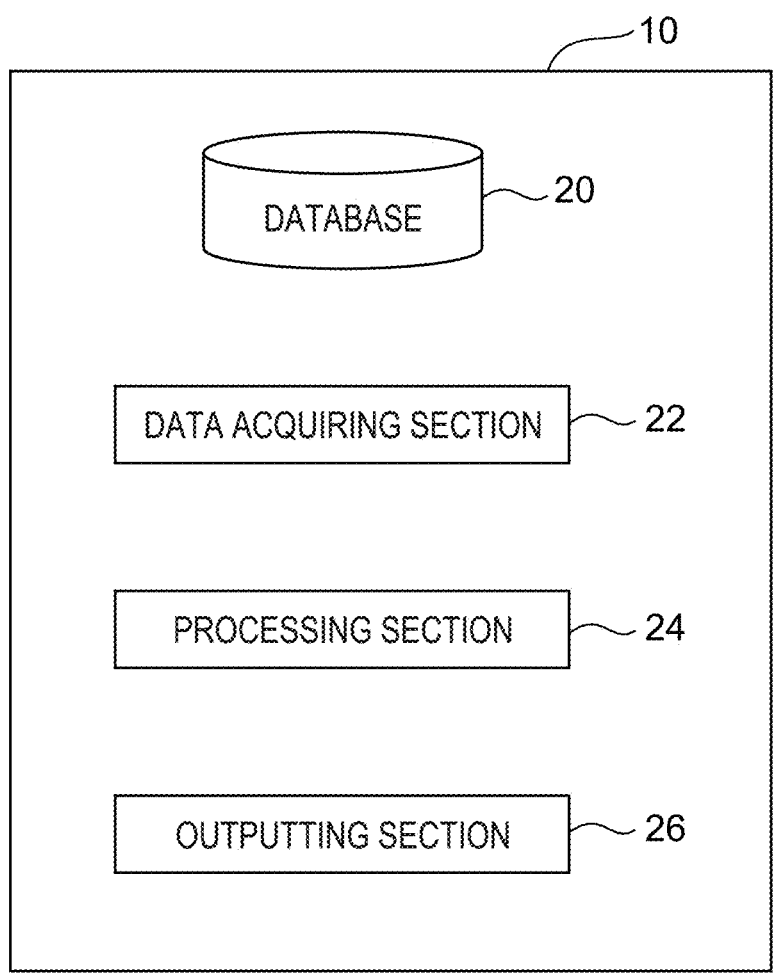
FIG. 2 is a block drawing illustrating the structure of the risk calculating device of the present embodiment.

Functional structures of the risk calculating device 10 are described next. FIG. 2 is a block drawing illustrating an example of the functional structures of the risk calculating device 10.

As illustrated in FIG. 2, the risk calculating device 10 functionally has a database 20, a data acquiring section 22, a processing section 24 and an outputting section 26.

The external damage information per tire and site information which have been inputted are stored in the database 20. For example, the company that operates the airplane on which the tire was mounted, airports that are bases for airplanes operated by that company, airports at which there is the possibility that the tire may have been externally damaged, information relating to the external damage, and the results of the retread inspection, which were obtained for each tire identification information from the external damage information per tire and the site information, are stored in the database 20 (see FIG. 3).

In the database 20, the airports used as bases by the company that operates the airplane to which the tire was mounted, and the operation history that is the airports where the airplane to which the tire was mounted departed/arrived, are stored as airports at which there is the possibility that the tire may have been externally damaged.

Further, in the database 20, the operation time period of the airplane to which the tire was mounted and the date of the retread inspection of the tire are stored as information relating to the external damage time period.

Further, in the database 20, OK/NG, the place of the external damage (tread/sidewall), the type of the external damage (detachment/cut/puncture), and the number of places where there was external damage, are stored as the results of the retread inspection. The extent (depth/length) of the external damage may be further stored in the database 20 as the results of the retread inspection.

The data acquiring section 22 acquires, per tire, the external damage information of the tire and the site information from the database 20.

Here, in a case in which the period of time that is the subject of calculation is designated, the data acquiring section 22 acquires, per tire, the external damage information and the site information that correspond to the calculation subject time period from the database 20. For example, the data acquiring section 22 acquires the airport where external damage was incurred and the results of inspection, per tire identification information whose information relating to the external damage time period (the center of the operation time period or the inspection date) is included in that calculation subject time period.

Further, in a case in which the place where there is external damage is designated, the data acquiring section 22 acquires, per tire, the external damage information and the site information that correspond to that place of external damage from the database 20. For example, the data acquiring section 22 acquires the airport where the external damage was incurred and the results of inspection, per tire identification information whose place of external damage that is in the inspection results corresponds to the designated place.

Further, in a case in which the type of external damage is designated, the data acquiring section 22 acquires, per tire, the external damage information and the site information that correspond to that type of external damage from the database 20. For example, the data acquiring section 22 acquires the airport where the external damage was incurred and the results of inspection, per tire identification information whose type of external damage that is in the inspection results corresponds to the designated type.

On the basis of the external damage information and the site information acquired for each tire, the processing section 24 calculates the risk, at each site, of tires being damaged externally.

Concretely, per tire, on the basis of the history information of sites that are airports where the airplane to which the tire was mounted departed/arrived, the processing section 24 respectively specifies the sites that are airports where the airplane to which the tire was mounted departed/arrived. On the basis of the results of specifying the sites per tire, and the external damage information per tire, the processing section 24 calculates the risk per site.

At the time of calculating the risk, for each tire, a score corresponding to the external damage information of the tire is distributed to each of the specified sites, and, on the basis of the sum of the scores distributed to each site, the risk is calculated for each site.

For example, for each tire, a score corresponding to the number of places of external damage of the tire is distributed uniformly to the respective airports that are the sites specified for that tire. Note that the score may be weighted in accordance with the type of the external damage of the tire.

Then, the risk that expresses the probability of incurring external damage is calculated by, for each airport, dividing the sum of the scores distributed to that airport by the number of airplanes that departed/arrived at that airport during a time period that includes the operation time period of the airplane of each tire.

Figure 4:
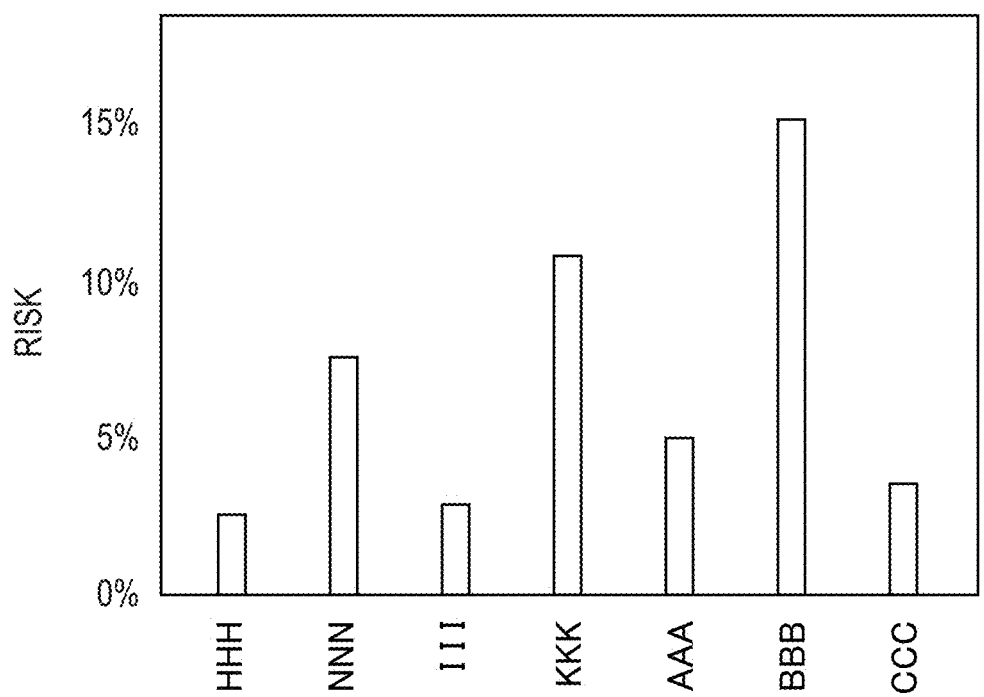
FIG. 4 is a drawing illustrating an example of output of results of calculating risk.

The outputting section 26 displays the risks that are calculated for the respective sites, by the display portion 16. For example, as illustrated in FIG. 4, a graph illustrating, per airport, the risk that expresses the probability of incurring external damage is displayed by the display portion 16. Here, at the time when a risk expressing the probability of incurring external damage exceeds a given threshold value, notification may be given to a predetermined party who is to be notified.

Further, the outputting section 26 may further output, per site, the place of the tire where there was external damage, the type of the external damage and/or the extent of the external damage. For example, at the time of calculating the risk, for each tire, the place of the tire where there was external damage, the type of the external damage and/or the extent of the external damage may be applied as external damage information of that tire to each of the specified sites, and results, in which the place of the tire where there was external damage, the type of external damage and/or the extent of the external damage that were applied are totaled, may be outputted per site. Due thereto, from the place of the tire where there was external damage, the type of the external damage and/or the extent of the external damage, the cause of having incurred external damage can be specified, and measures at the airport can be taken. For example, causes can be specified per category, such as riding-up on a light, riding over a nail, or the like. Further, if the place where there is external damage is the sidewall, it can be specified that there is a strong possibility that the external damage is due to a rut or a projection.

Operation of Risk Calculating Device Relating to Present Embodiment

The operation of the risk calculating device 10 relating to the present embodiment is described next.

First, when the inputting portion 15 of the risk calculating device 10 receives, as input, external damage information per tire mounted to an airplane, and site information relating to sites where there is the possibility that the tire was externally damaged, the inputting portion 15 stores the external damage information per tire and the site information, which were inputted, in the database 20. At this time, for each of the tire identification information, the company operating the airplane on which the tire was mounted, airports that are bases for airplanes operated by that company, airports at which there is the possibility that the tire was externally damaged, information relating to the external damage, and the results of retread inspection, are stored in the database 20 in association.

Figure 5:
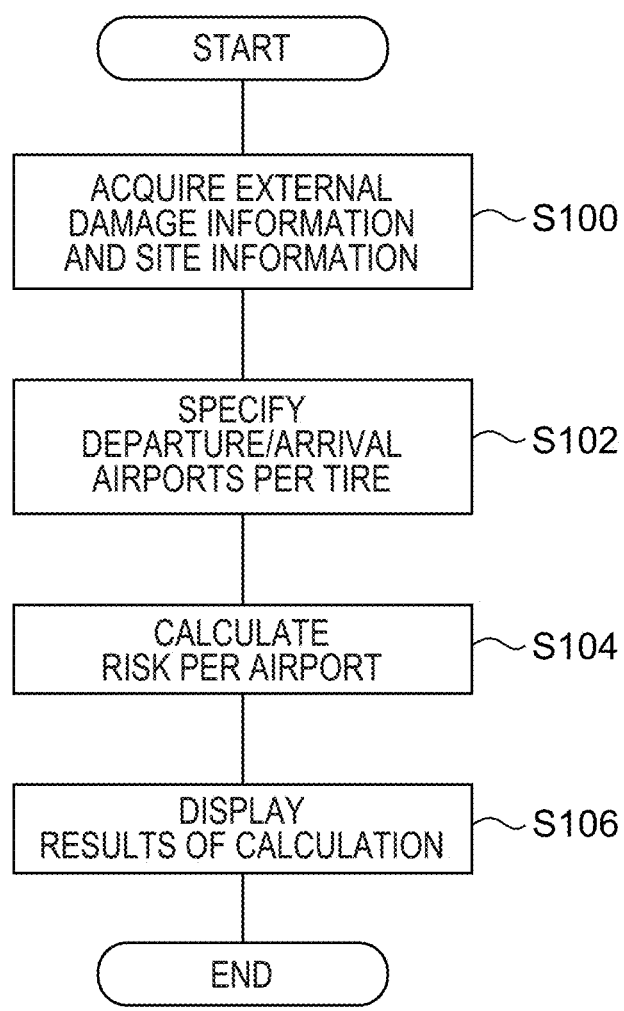
FIG. 5 is a flowchart illustrating a risk calculating processing routine of the risk calculating device of the present embodiment.

Further, FIG. 5 is a flowchart illustrating the flow of the risk calculating processing by the risk calculating device 10. The risk calculating processing is carried out due to the CPU 11 reading-out the risk calculating program from the ROM 12 or the storage 14 and expanding and executing the program in the RAM 13.

In step S100, as the data acquiring section 22, the CPU 11 acquires, per tire, the external damage information of that tire and the site information from the database 20.

In step S102, as the processing section 24, the CPU 11 specifies, for each tire, each of the sites that is an airport where the airplane to which that tire was mounted departed/arrived, from the site information associated with the identification information for that tire.

In step S104, as the processing section 24, the CPU 11 calculates the risk for each site that is an airport, on the basis of the results of specifying sites for each tire, and the external damage information associated with the identification information of each tire.

In step S106, as the outputting section 26, the CPU 11 displays the risk, which was calculated for each site, by the display portion 16, and ends the risk calculating processing.

As described above, the risk calculating device relating to the present embodiment acquires external damage information for each tire mounted to an airplane, and site information relating to sites at which there is the possibility that the tire was externally damaged, and calculates the risk of a tire being externally damaged at that site. Due thereto, the risk of a site where an airplane departs/arrives can be calculated from information that is obtained in inspecting tires that were mounted to airplanes. In particular, by using external damage information acquired in inspecting a tire at the time of a retread inspection, and operation history of the airplane that can be obtained offline, the risk of a tire being externally damaged at each airport at which the airplane departs/arrives can be calculated.

Further, the provision of information of the calculated risk to each airport can be combined with actions for reducing external damage to tires. Accordingly, the information can be utilized toward improving the asset values of tires.

Further, as a method of utilizing the risk of a tire being externally damaged, the results of measures with respect to objects that have fallen on runways, which measures are taken per airport for example, can be evaluated by comparing the risks of external damage of two different time periods. For example, by comparing the risks of external damage of before and after the introduction of fallen object radar that is installed at an airport, it is possible to evaluate the performance of the fallen object radar. Or, by comparing the risks of external damage of before and after activities for cleaning a runway, the effects of the activities can be evaluated.

Modified Example

Note that the present invention is not limited to the above-described embodiment, and various modifications and applications are possible within a scope that does not depart from the gist of the invention.

For example, the above-described embodiment describes, as an example, a case of using history information of sites that are airports where the airplane to which the tire was mounted departed/arrived. However, the present disclosure is not limited to this. History information, which is obtained per company, of sites that are airports where airplanes of that company have departed/arrived may be used. In this case, the site information that is acquired includes identification information of the company operating the airplane to which the tire is mounted, and, per company identification information, history information of sites that are airports where airplanes of that company have departed/arrived. Further, for each tire, the processing section 24 specifies respective sites, which are the airports where the airplane to which the tire was mounted departed/arrived, on the basis of the history information of sites that are airports where airplanes of the company, which operates the airplane to which the tire was mounted, depart/arrive. On the basis of the results of specification of the sites per tire and the external damage information per tire, the processing section 24 calculates the risk for each site. In this example, even if the airplane to which the tire was mounted is unknown, if the company that operates the airplane to which the tire was mounted is known, information of airports that are the bases of the airplanes of that company can be obtained, and therefore, the risk of a tire incurring external damage can be calculated. Further, at the time of distributing scores that correspond to the external damage information of tires to each specified airport, the scores may be distributed uniformly to the airports that are the bases of the airplanes of that company, or the scores may be distributed in accordance with the proportions of the airports that the airplanes of that company use.

Figure 6:
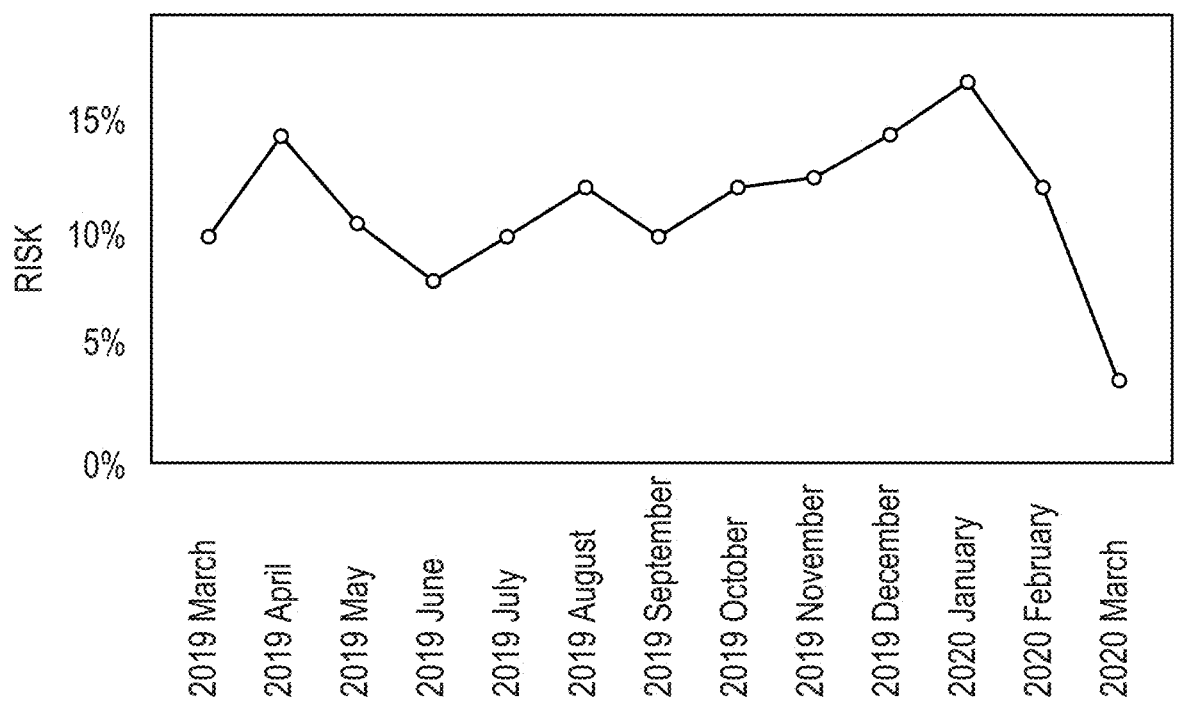
FIG. 6 is a drawing illustrating an example of output of results of calculating risk.

Further, the risk may be calculated per predetermined time period (e.g., per month, per year). In this case, for each predetermined time period, external damage information and site information corresponding to that predetermined time period are acquired for each tire from the database 20, and the risk for that predetermined time period is calculated per site. Further, at the time of outputting, as illustrated in FIG. 6, the results of risk calculation are outputted per predetermined time period for a designated site. FIG. 6 illustrates an example of outputting the results of risk calculation per month of a designated airport.

Further, risk may be calculated on the basis of the NG rate of the inspection results. For example, for each tire, the inspection result (OK or NG) of the tire is applied to each airport that is a specified site for that tire, and, for each airport, the NG rate is calculated from the respective tire inspection results that were applied to that airport, and the calculated NG rate is used as the risk that expresses the probability of incurring external damage.

Further, at the time of calculating risk, the value of the risk may be weighted in accordance with the position where the tire is installed. For example, because nails and the like are flung-up by the front wheels of the main tires, it is easy for the rear wheels of the main tires to be externally damaged. Namely, as compared with the nose tires, it is easy for the rear wheels of the main tires to be externally damaged. Due thereto, the scores of the external damage of the rear wheels of the main tires may be weighted more strongly as compared with those of the nose tires.

Further, at the time of calculating the risk, the value of the risk may be weighted in accordance with the ease of incurring external damage of the airframe, the tire size, or the tire type (durability).

Further, the range in which the risk is calculated and outputted may be limited. For example, a designation of a company that operates airplanes may be received, and the risk may be calculated and outputted on the basis of information of tires relating to the designated company. Further, a designation of airports may be received, and the respective risks of the designated airports may be calculated and outputted. Due thereto, a setting can be carried out as to whether or not information relating to a designated company is to be disclosed as data to the airports that are used.

Further, an example is described of a case in which the outputting section 26 displays, by the display portion 16 and per airport, a graph illustrating risk that expresses the probability of incurring external damage. However, the present disclosure is not limited to this. Risks expressing probabilities of incurring external damage may be compared per geographical region, per airport, per company that operates the airplanes, or per type of airframe, and may be outputted together with the rankings thereof.

Figure 7:
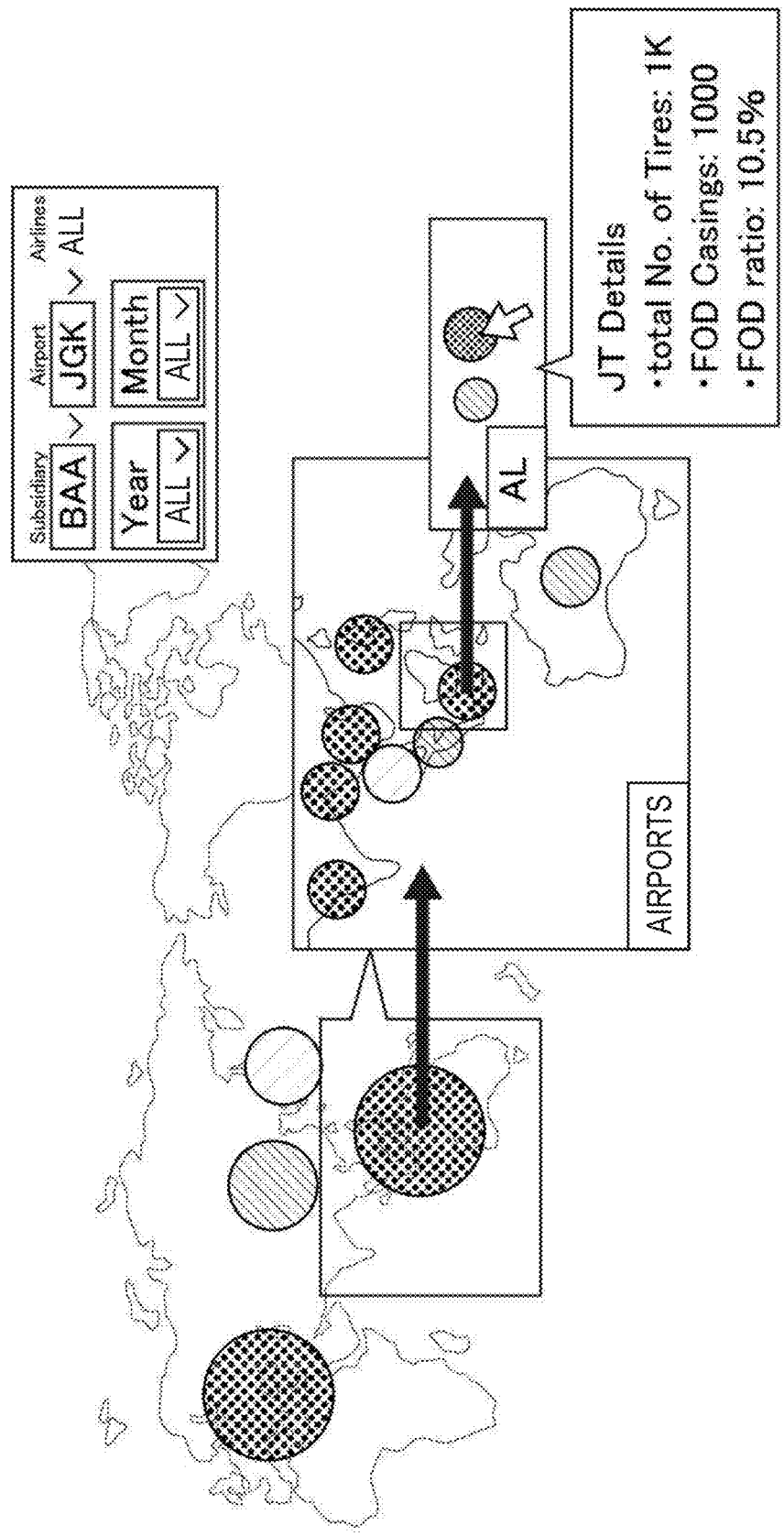
FIG. 7 is a drawing illustrating an example of outputting risks of incurring external damage, as a hazard map illustrated per geographical region.
Figure 8:
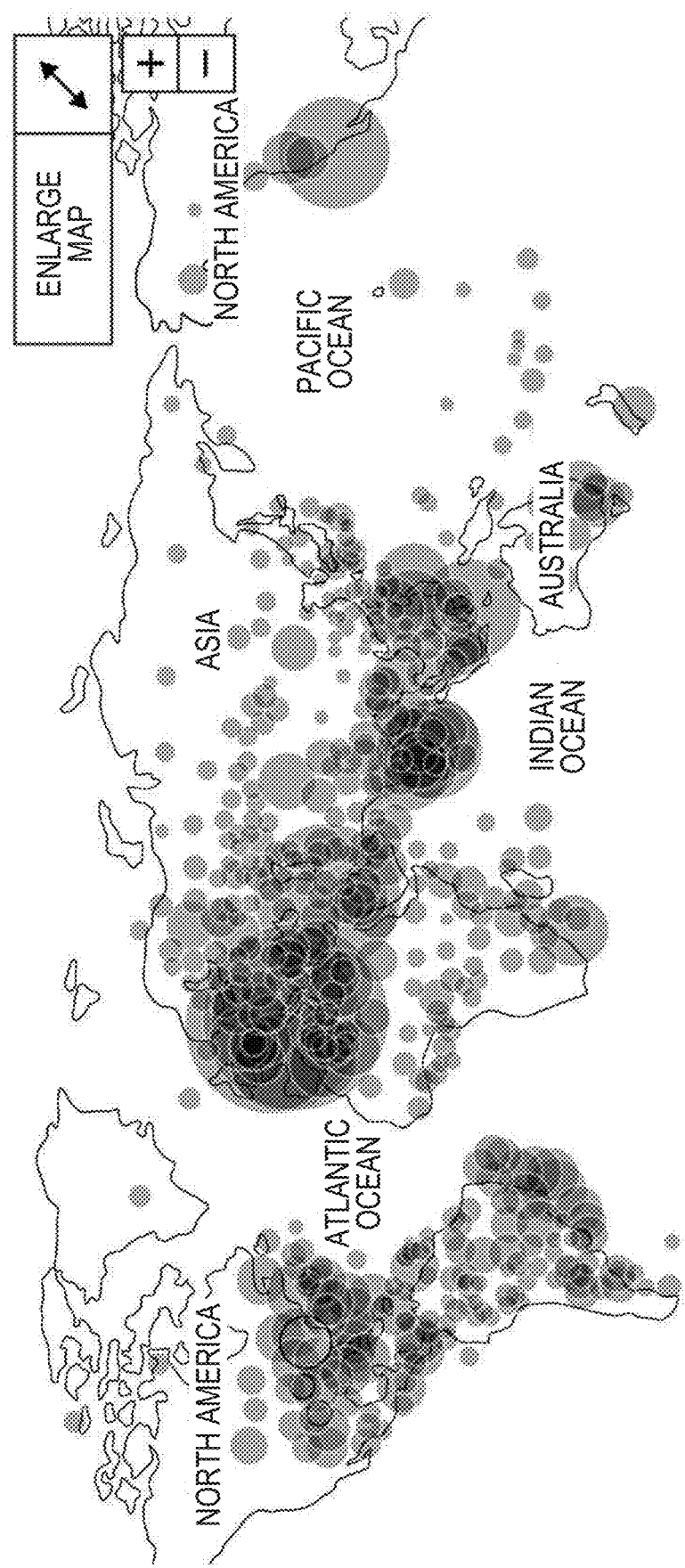
FIG. 8 is a drawing illustrating an example of outputting risks of incurring external damage, as a hazard map illustrated per geographical region.

For example, as illustrated in FIG. 7 and FIG. 8, risks of incurring external damage may be outputted as a hazard map illustrated per geographical region. FIG. 7 illustrates an example in which bubbles, whose colors and sizes are made to differ in accordance with the risk, are displayed per geographical region. Further, FIG. 7 illustrates an example in which the selection of a bubble of a given geographical region is received, and a bubble corresponding to the risk is displayed per airport of that geographical region. Further, FIG. 7 illustrates an example in which the selection of a bubble of a given airport is received, and a bubble corresponding to the risk is displayed per company that operates airplanes of that airport. Further, FIG. 7 illustrates an example in which the selection of a bubble of a given company is received, and detailed information of the risk relating to airplanes that that company operates is displayed. Further, FIG. 7 illustrates an example in which designations of geographical regions, airports, companies that operate airplanes, and year/month, which are subjects of display, are received. FIG. 8 illustrates an example in which bubbles, whose sizes are varied in accordance with risk, are displayed per geographical region.

Further, any of various types of processors other than a CPU may execute the various processings that are executed due to a CPU reading-in software (a program) in the above-described respective embodiments. Examples of processors in this case include PLDs (Programmable Logic Devices) whose circuit structure can be changed after production such as GPUs (Graphics Processing Units), FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the risk calculating processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above-described respective embodiments describe aspects in which the risk calculating program is stored in advance (is installed) in the storage 14, but the present disclosure is not limited to this. The program may be provided in a form of being stored on a non-transitory storage medium such as a CD-ROM (Compact Disk Read Only Memory), a DVD-ROM (Digital Versatile Disk Read Only Memory), a USB (Universal Serial Bus) memory, or the like. Further, the program may be in a form of being downloaded from an external device through a network.

The following notes are additionally disclosed in relation to the above-described embodiments.

(Note 1)

A risk calculating device comprising:
a memory; and
at least one processor connected to the memory,
wherein the processor:
acquires external damage information per tire mounted to airplanes, and site information relating to sites at which there is possibility that the tires incurred external damage;
on the basis of the external damage information per tire and the site information, calculates risk, per site, of tires incurring external damage; and
outputs the risk that has been calculated per site.

(Note 2)

A non-transitory storage medium storing a program executable by a computer to execute risk calculating processing,
wherein the risk calculating processing:
acquires external damage information per tire mounted to airplanes, and site information relating to sites at which there is possibility that the tires incurred external damage;
on the basis of the external damage information per tire and the site information, calculates risk, per site, of tires incurring external damage; and
outputs the risk that has been calculated per site.

Note that the disclosure of Japanese Patent Application No. 2021-203608 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A risk calculating device comprising:
a memory; and
at least one processor coupled to the memory, the at least one processor being configured to:
acquire external damage information per tire mounted to airplanes, and site information relating to sites at which there is possibility that the tires incurred external damage;
based on the external damage information per tire and the site information, calculate risk, per site, of tires incurring external damage; and
output the risk that has been calculated per site as a hazard map displaying bubbles, whose sizes are varied in accordance with risk, per geographical region,
wherein the external damage information includes identification information of the tires,
wherein the site information includes airframe information, in which the identification information of the tires and identification information of airplanes to which the tires were mounted are associated with one another, and, per identification information of the airplane, history information of sites that are airports where the airplane departed/arrived, and
wherein, per tire and based on the history information of sites that are airports where the airplane to which the tire was mounted departed/arrived, the at least one processor specifies respective sites that are airports where the airplane to which the tire was mounted departed/arrived, and calculates the risk per site based on results of specifying the sites per tire and the external damage information per tire.

2. The risk calculating device of claim 1, wherein:
based on the results of specifying the sites, the at least one processor distributes a score corresponding to the external damage information of the tires to each of the specified sites, and
the at least one processor calculates the risk per site based on a total of the scores distributed to the site.

3. A risk calculating device comprising:
a memory; and
at least one processor coupled to the memory, the at least one processor being configured to:
acquire external damage information per tire mounted to airplanes, and site information relating to sites at which there is possibility that the tires incurred external damage;
based on the external damage information per tire and the site information, calculate risk, per site, of tires incurring external damage; and
output the risk that has been calculated per site as a hazard map displaying bubbles, whose sizes are varied in accordance with risk, per geographical region,
wherein the external damage information includes identification information of the tires,
wherein the site information includes the identification information of the tires, identification information of companies that operate the airplanes to which the tires were mounted, and, per identification information of the company, history information of sites that are airports where airplanes of the company departed/arrived, and
wherein, per tire and based on the history information of sites that are airports where airplanes of the company operating the airplane to which the tire was mounted departed/arrived, the at least one processor specifies respective sites that are airports where the airplane to which the tire was mounted departed/arrived, and calculates the risk per site based on results of specifying the sites per tire and the external damage information per tire.

4. The risk calculating device of claim 1, wherein:
the external damage information includes a time period in which external damage was incurred, and
based on the external damage information per tire and the site information that correspond to a time period that is a subject of calculation, the at least one processor calculates, per site, the risk during the time period that is the subject of calculation.

5. The risk calculating device of claim 3, wherein:
the external damage information includes a time period in which external damage was incurred, and
based on the external damage information per tire and the site information that correspond to a time period that is a subject of calculation, the at least one processor calculates, per site, the risk during the time period that is the subject of calculation.

6. The risk calculating device of claim 1, wherein:
the external damage information includes a type of external damage or a position where external damage was incurred, and
based on the external damage information per tire and the site information that correspond to the type of external damage or the position where external damage was incurred that is a subject of calculation, the at least one processor calculates, per site, the risk with respect to the type of external damage or the position where external damage was incurred that is the subject of calculation.

7. The risk calculating device of claim 3, wherein:
the external damage information includes a type of external damage or a position where external damage was incurred, and
based on the external damage information per tire and the site information that correspond to the type of external damage or the position where external damage was incurred that is a subject of calculation, the at least one processor calculates, per site, the risk with respect to the type of external damage or the position where external damage was incurred that is the subject of calculation.

8. The risk calculating device of claim 3, wherein:
based on the results of specifying the sites, the at least one processor distributes a score corresponding to the external damage information of the tires to each of the specified sites, and
the at least one processor calculates the risk per site based on a total of the scores distributed to the site.

9. A risk calculating method, comprising, by a computer:
acquiring external damage information per tire mounted to airplanes, and site information relating to sites at which there is possibility that the tires incurred external damage;
based on the external damage information per tire and the site information, calculating risk, per site, of tires incurring external damage; and
outputting the risk that has been calculated per site as a hazard map displaying bubbles, whose sizes are varied in accordance with risk, per geographical region,
wherein the external damage information includes identification information of the tires,
wherein the site information includes airframe information, in which the identification information of the tires and identification information of airplanes to which the tires were mounted are associated with one another, and, per identification information of the airplane, history information of sites that are airports where the airplane departed/arrived, and
wherein, per tire and based on the history information of sites that are airports where the airplane to which the tire was mounted departed/arrived, the computer specifies respective sites that are airports where the airplane to which the tire was mounted departed/arrived, and calculates the risk per site based on results of specifying the sites per tire and the external damage information per tire.

10. A risk calculating method, comprising, by a computer:
acquiring external damage information per tire mounted to airplanes, and site information relating to sites at which there is possibility that the tires incurred external damage;
based on the external damage information per tire and the site information, calculating risk, per site, of tires incurring external damage; and
outputting the risk that has been calculated per site as a hazard map displaying bubbles, whose sizes are varied in accordance with risk, per geographical region,
wherein the external damage information includes identification information of the tires,
wherein the site information includes the identification information of the tires, identification information of companies that operate the airplanes to which the tires were mounted, and, per identification information of the company, history information of sites that are airports where airplanes of the company departed/arrived, and
wherein, per tire and based on the history information of sites that are airports where airplanes of the company operating the airplane to which the tire was mounted departed/arrived, the computer specifies respective sites that are airports where the airplane to which the tire was mounted departed/arrived, and calculates the risk per site based on results of specifying the sites per tire and the external damage information per tire.

11. A non-transitory storage medium storing a program executable by a computer to perform risk calculating processing, the risk calculating processing comprising:
acquiring external damage information per tire mounted to airplanes, and site information relating to sites at which there is possibility that the tires incurred external damage;
based on the external damage information per tire and the site information, calculating risk, per site, of tires incurring external damage; and
outputting the risk that has been calculated per site as a hazard map displaying bubbles, whose sizes are varied in accordance with risk, per geographical region,
wherein the external damage information includes identification information of the tires,
wherein the site information includes airframe information, in which the identification information of the tires and identification information of airplanes to which the tires were mounted are associated with one another, and, per identification information of the airplane, history information of sites that are airports where the airplane departed/arrived, and
wherein, per tire and based on the history information of sites that are airports where the airplane to which the tire was mounted departed/arrived, the computer specifies respective sites that are airports where the airplane to which the tire was mounted departed/arrived, and calculates the risk per site based on results of specifying the sites per tire and the external damage information per tire.

12. A non-transitory storage medium storing a program executable by a computer to perform risk calculating processing, the risk calculating processing comprising: acquiring external damage information per tire mounted to airplanes, and site information relating to sites at which there is possibility that the tires incurred external damage; based on the external damage information per tire and the site information, calculating risk, per site, of tires incurring external damage; and outputting the risk that has been calculated per site as a hazard map displaying bubbles, whose sizes are varied in accordance with risk, per geographical region, wherein the external damage information includes identification information of the tires, wherein the site information includes the identification information of the tires, identification information of companies that operate the airplanes to which the tires were mounted, and, per identification information of the company, history information of sites that are airports where airplanes of the company departed/arrived, and wherein, per tire and based on the history information of sites that are airports where airplanes of the company operating the airplane to which the tire was mounted departed/arrived, the computer specifies respective sites that are airports where the airplane to which the tire was mounted departed/arrived, and calculates the risk per site based on results of specifying the sites per tire and the external damage information per tire.

\* \* \* \* \*